United States Patent [19]

Yonemitsu et al.

[11] Patent Number: 5,140,437

[45] Date of Patent: Aug. 18, 1992

[54] RECORDING/REPRODUCING COMPRESSED DATA ON A ROTATABLE RECORD MEDIUM IN WHICH AT LEAST ONE INTRAFRAME CODE SIGNAL AND AT LEAST (N−1) INTERFRAME CODE SIGNALS ARE RECORDED IN EACH TRACK

[75] Inventors: Jun Yonemitsu; Yoichi Yagasaki, both of Kanagawa, Japan

[73] Assignee: Sony Corporation, Tokyo, Japan

[21] Appl. No.: 509,493

[22] Filed: Apr. 16, 1990

[30] Foreign Application Priority Data

Apr. 2, 1989 [JP] Japan .................. 1-101249

[51] Int. Cl.$^5$ ........................ H04N 5/76
[52] U.S. Cl. ...................... 358/342; 358/335; 358/135; 360/33.1; 360/32
[58] Field of Search ............... 358/335, 135, 136, 133, 358/342; 360/33.1, 35.1, 32

[56] References Cited

U.S. PATENT DOCUMENTS

| | | | |
|---|---|---|---|
| 4,161,753 | 7/1979 | Bailey et al. | 358/128 |
| 4,546,386 | 10/1985 | Matsumoto et al. | 358/136 |
| 4,707,738 | 11/1987 | Ferre et al. | 358/133 |
| 4,750,055 | 6/1988 | Van Lier | 358/342 |
| 4,785,349 | 11/1988 | Keith et al. | 358/138 |
| 4,837,618 | 6/1989 | Hatori et al. | 358/136 |
| 4,868,653 | 9/1989 | Golin et al. | 358/133 |
| 4,942,476 | 7/1990 | Koga et al. | 358/335 |

FOREIGN PATENT DOCUMENTS

3437182  4/1986  Fed. Rep. of Germany ........ 360/32

Primary Examiner—Roy N. Envall, Jr.
Assistant Examiner—Huy Nguyen
Attorney, Agent, or Firm—Alvin Sinderbrand; William S. Frommer

[57] ABSTRACT

Image data is recorded in successive turns on a rotatable record medium driven at substantially constant linear velocity by converting a first of successive image frames of image data to an intraframe code signal, converting the (n−1) next-following frames to (n−1) interframe code signals, and recording the intraframe and (n−1) interframe code signals on the record medium. In one embodiment, n is the maximum number of image frames that can be recorded in the innermost turn of the record medium and n is constant for all turns, whereby the same number (n−1) of interframe code signals separate successive intraframe code signals from turn to turn. In another embodiment, n is a variable and increases as the radius of the turn in which the code signals are recorded increases, whereby a larger number (n−1) of interframe code signals separate successive intraframe code signals as the turn radius increases. The recorded image data is recovered by reproducing the recorded intraframe and interframe code signals and selectively coupling the reproduced code signals to an intraframe decoder or to an interframe decoder as a function of whether intraframe or interframe code signals are reproduced.

62 Claims, 5 Drawing Sheets

RECORDING/REPRODUCING COMPRESSED DATA ON A ROTATABLE RECORD MEDIUM IN WHICH AT LEAST ONE INTRAFRAME CODE SIGNAL AND AT LEAST (N−1) INTERFRAME CODE SIGNALS ARE RECORDED IN EACH TRACK

BACKGROUND OF THE INVENTION

1. Field of the Invention

This invention relates to a method and apparatus for recording/reproducing data on a rotatable record medium and, more particularly, to a technique by which image data is recorded in data-compressed form but, nevertheless, can be reproduced when the medium is scanned in a special mode, such as a high speed search mode, to permit a viewable display of the recorded images while that medium is scanned.

2. Description of the Prior Art

The recording of image information on a record medium has long been known. Magnetic recording permits the re-use of a magnetic medium to record and reproduce image information several times. For example, image information is recorded in slant tracks on a magnetic tape or in successive turns on a magnetic disk, such as the successive turns of a spiral track or in concentric circular tracks on the disk. Image information also has been recorded on video disks, such as laser disks in which image data is represented by pits and lands. Recently, it has been proposed that image information in the form of video signals be recorded on an optically readable disk conforming generally in size and physical characteristics to the so-called audio "compact disk", conventionally referred to as a "CD". Such information may be recorded in successive turns of a single spiral track or in consecutive circular tracks.

A compact disk, on which information may be thought of as being permanently recorded, may be "read" several times. Such a disk functions as a memory for recorded digital information and often is referred to as a "CD-ROM". Compact disks and CD-ROM's generally conform to "standards" which tend to limit the amount of information that can be recorded thereon. Such standards establish, inter alia, the rotary speed of the disk and the number and density of the tracks that may be recorded thereon. When digital video information is recorded, as by digitizing a conventional video-signal (e.g. an NTSC signal), the CD-ROM conforming to such standards exhibits a recording capacity on the order of about one hour. Thus, a video program whose duration does not exceed approximately one hour may be recorded and played back from such a CD-ROM.

It is appreciated that a larger quantity of data may be recorded on a CD-ROM if that data is subjected to data compression techniques. For example, the inherent redundancy in video information suggests that video signals are favorably susceptible to data compression. An adaptive process for the coding and decoding of a sequence of pictures by discrete cosine transformation has been proposed in U.S. Pat. No. 4,707,738. As described in this patent, video signals may be data compressed by producing "inter-picture" and "intra-picture" representations of image information. The inter-picture information, or code, represents the differences between two successive pictures, or frames. This difference information constitutes a substantial compression of data, although a video picture cannot be reproduced from a given inter-picture code signal without a reference picture or frame to which the difference information may be combined to reconstitute the encoded picture. However, the intra-picture information represents substantially all of the information of a given frame and, thus, constitutes a rather small amount of data compression.

Using the adaptive coding process of the aforementioned patent, intraframe code signals and interframe code signals may be recorded on a CD-ROM to extend the effective capacity of that CD-ROM for recording video signals. This technique is particularly advantageous when highly animated image data is encoded. Thus, by using intraframe and interframe code signals, image data which varies rapidly over several frames may be data compressed. Such encoding of image information into intraframe and interframe code signals is particularly adapted for compressing the large amount of information present in a high density television signal.

Typically, a first image frame is encoded as an intraframe code signal and then, several frames later, another image frame is encoded as an intraframe code signal. Those image frames which extend between the successive intraframe encoded frames are encoded as interframe code signals. When these intraframe and interframe code signals are recorded on a CD-ROM, such as in successive turns of a spiral track, an intraframe code signal may be recorded in one turn but the next intraframe code signal may not be recorded for several turns. This may not present any difficulties during normal video playback modes because the several successive interframe code signals which are reproduced are combined with the information derived from the previously reproduced intraframe code signal to recover whole frames of image data for display as a conventional television picture having excellent fidelity. Indeed, several turns of merely interframe code signals may be reproduced without any noticeable deterioration in the quality of the displayed picture.

However, when one intraframe code signal followed by several turns of interframe code signals are recorded, the television picture reproduced therefrom during special reproducing modes, such as a high speed search mode, may not be acceptable. In a high speed search mode, the playback head is moved radially across the record medium at a relatively high speed. Hence, successive interframe code signals are not reproduced. Rather, the radial movement of the head during this "track jumping" operation reproduces selective, individual interframe code signals that may vary greatly from the previous intraframe code signal that was played back. Hence, image frames which are derived from these individual interframe code signals may exhibit less than acceptable quality during special reproducing modes. Therefore, if image information is to be recorded on a rotatable medium, such as a CD-ROM, data compression by way of interframe coding may not permit satisfactory high speed searching.

OBJECTS AND SUMMARY OF THE INVENTION

Therefore, it is an object of the present invention to provide an improved technique for recording and reproducing image data on a rotatable record medium which permits high data compression of the image data yet enables high quality viewable images to be reproduced therefrom during both normal and special reproducing modes.

Another object is to record data-compressed image information on a rotatable record medium which may be reproduced and accurately displayed as a video picture during high speed searching of that medium.

A further object of this invention is to provide a technique for recording and reproducing image information in the form of data-compressed intraframe and interframe code signals in successive turns of a rotatable record medium such that at least one intraframe code signal is recorded in each turn.

An additional object of this invention is to provide a technique of the aforementioned type in which the number of interframe code signals which are recorded between successive intraframe code signals is fixed for all turns of the record medium.

Still another object of this invention is to provide a technique of the aforementioned type in which the number of interframe code signals which are recorded between successive intraframe code signals varies as a function of the radius of the turn in which they are recorded.

Yet a further object of this invention is to provide a technique in which image data is recorded on a rotatable record medium as data-compressed intraframe and interframe code signals, with the intraframe code signals being recorded at locations proximate each other in successive turns.

Various other objects, advantages and features of the present invention will become readily apparent from the ensuing detailed description, and the novel features will be particularly pointed out in the appended claims.

In accordance with this invention, image data is recorded in successive turns on a rotatable record medium by converting a first of successive image frames of image data to an intraframe code signal, converting the $(n-1)$ next-following frames to $(n-1)$ interframe code signals, and recording the intraframe and $(n-1)$ interframe code signals on the record medium. In one embodiment, n is the maximum number of image frames that can be recorded in the innermost turn of the record medium, n is constant for all turns and an intraframe and $(n-1)$ interframe code signals are recorded in all turns. In this embodiment, the same number $(n-1)$ of interframe code signals separate successive intraframe code signals in all turns.

In another embodiment, n is a variable and increases as the radius of the turn in which the code signals are recorded increases. In this other embodiment, a larger number $(n-1)$ of interframe code signals separate successive intraframe code signals as the turn radius increases.

As one aspect of this other embodiment, since intraframe code signals are recorded at locations proximate each other in successive tracks, during a special reproducing code, such as a high speed search mode, the pick-up head may be advanced rapidly in the radial direction and may jump from one intraframe code signal to another from track-to-track to reproduce a video picture of good fidelity while searching.

In one application of this invention, the successive turns in which the intraframe and interframe code signals are recorded constitute a spiral track on the record medium. In another application, the successive turns constitute consecutive circular tracks. Preferably, the record medium comprises an optically readable compact disk, such as a CD-ROM; but, alternatively, the record medium may comprise a magnetic disk.

As another feature of this invention, the recorded image data is recovered by reproducing the intraframe and interframe code signals and selectively coupling those code signals either to an intraframe decoder or to an interframe decoder from which images are reproduced. The selective coupling is controlled as a function of whether intraframe or interframe code signals are reproduced. In one embodiment, the intraframe and/or interframe code signals are provided with identifying data; and this identifying data is detected and used to couple the reproduced code signals to one or the other decoder. In another embodiment, a predetermined number $(n-1)$ of interframe code signals separates successive intraframe code signals; and the selective coupling of the code signals to one or the other decoder is controlled as a function of the number of code signals which are reproduced. In still another embodiment, the number $(n-1)$ of interframe code signals which separates successive intraframe code signals varies as the radius of the turn in which those code signals are recorded. The selective coupling of the reproduced code signals to one or the other decoder is controlled as a function of the radial position of the pick-up head used to reproduce those code signals.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Before proceeding with a description of the present invention, an explanation and definition of the terms "intraframe code signal" and "interframe code signal" are provided. As mentioned above, data compression is achieved preferably by an adaptive process for coding a sequence of image frames by discrete cosine transformation. One example of apparatus for implementing this process to produce both intraframe and interframe code signals is described in U.S. Pat. No. 4,707,738, and another example is discussed hereinbelow with respect to FIG. 6. Likewise, one implementation of the adaptive process for decoding the intraframe and interframe code signals is described in the aforementioned patent, and another example of a suitable decoder is described below in conjunction with FIG. 7. From the aforementioned patent and forthcoming discussion, it will be recognized that an intraframe code signal contains most of the information of an original image frame of image data, such as an original video signal, and although data compression is achieved, the degree of such compression is substantially less than that attained by an interframe code signal. The latter is produced using a discrete cosine transformed signal and represents differences between successive frames of the image signal. The transformed differences are encoded, as by a variable length coding arrangement, and the amount of data needed to represent those differences is far less than the amount of data needed to represent the entire image frame. Consequently, the interframe code signal exhibits substantial data compression.

Although the invention described herein preferably uses discrete cosine transformation of the image data from which intraframe and interframe code signals are produced, other efficient data compression encoding techniques can be used. For example, adaptive dynamic range coding which encodes the image information as a function of the dynamic range of the image data within discrete blocks of the image frame. Other encoding processes may be used, if desired.

Figure 1:
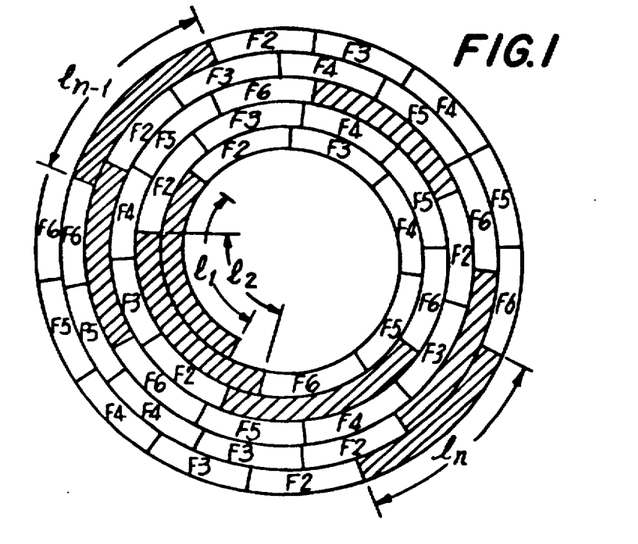
FIG. 1 is a schematic representation of a record medium having image information recorded thereon in accordance with one embodiment of the present invention.

Turning now to FIG. 1, there is illustrated a schematic representation of a record medium 10 having data compressed image information recorded thereon. For convenience, the image information is recorded in successive turns T1, T2, T3, etc. which constitute a spiral track. Alternatively, turns T1, T2, etc. may comprise discrete circular tracks. Furthermore, it is assume that record medium 10 is a compact disk, such as a CD-ROM, and the information recorded in successive turns T1, T2, etc. is digital information representing image frames. It is appreciated that the CD-ROM is a copy to be used by a suitable player from which the recorded image data is reproduced. FIG. 1 also illustrates the track configuration recorded on a master disk from which a mother is made to produce CD-ROM copies. Of course, record medium 10 may be a magnetic disk having the illustrated track configuration.

Figure 2:
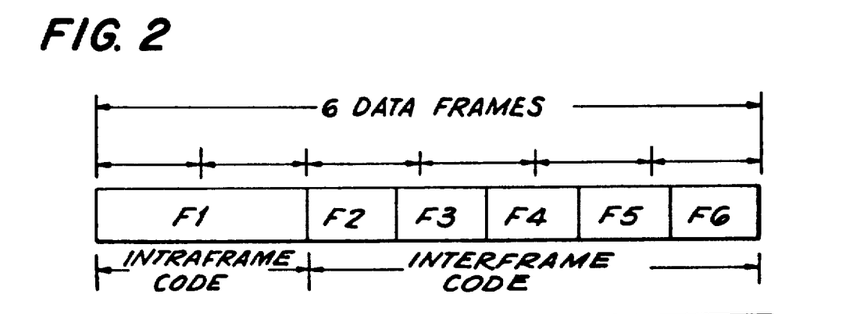
FIG. 2 is a schematic representation of one embodiment of the recording format used to record intraframe and interframe code signals.

An understanding of FIG. 1 is best appreciated by referring to the recording format illustrated in FIG. 2. This recording format represents six successive image frames F1-F6 which have been encoded into an intraframe code signal F1 and five succeeding interframe code signals F2, F3, ... F6.

Six data frames have been selected for the following reason: Let it be assumed that record medium 10 is a CD-ROM. When this medium is driven at a rate conventionally used for compact disk applications, the innermost turn exhibits a capacity of recording approximately 5.5 image frames, wherein each frame is a conventional video signal frame. If the medium is driven with constant linear velocity then, as the recording head or playback head is driven radially outward, the angular speed of the medium is reduced such that the linear velocity of each turn is substantially constant. When recording and reproducing image information at constant linear velocity, and assuming a recording capacity of approximately one hour, the innermost turn T1 may record six image frames, provided that data compression is employed. Thus, six image frames are compressed to "fit" into a turn capable of storing 5.5 image frames.

As illustrated in FIG. 2, the six image frames constitute a set, and successive sets of image frames are recorded in successive turns. The six-frame set is comprised of image frame F1 encoded as an intraframe code signal and each of image frames F2-F6 encoded as an interframe code signal. As shown in FIG. 1, the intraframe code signal F1 is recorded in an area of track T1 in which two data frames may be recorded, and is represented by the hatched area. Each interframe code signal F2-F6 is recorded in an area equal to approximately 0.8 data frames; whereupon the six image frames are data compressed and recorded as interframe code signal F1 followed by interframe code signals F2-F6.

At the completion of interframe code signal F6, medium 10 completes approximately one full rotation. Then, in track T2, the next six-frame set of image frames is recorded, with an intraframe code signal F1 followed by successive interframe code signals F2-F6. Thus, in each turn, a six-frame set of encoded image data is recorded.

Each turn has a set of image frames recorded therein. In the embodiment described herein, the number n of image frames in each set is constant, and as a numerical example, each set is comprised of six image frames. The linear length l of the intraframe code signals is constant from turn to turn such that $l_1 = l_2 = \ldots l_{n-1} = l_n$. Consequently, during special reproducing modes, such as the high speed search mode, an intraframe code signal is recorded in each turn and as the pick-up head is moved in the radial direction, an intraframe code signal may be picked up from each turn. In the outer turns, plural intraframe code signals may be recorded in a turn. Hence, an accurate video picture may be produced because the head need not pass over several tracks in which no intraframe code signal is recorded. It is recalled that an image picture of poor quality is expected if the head reproduces interframe code signals from several turns because the reference intraframe code signal which may have been recovered from an inner turn contains image information that is quite different from the interframe code signals that may be recovered from several later turns.

Therefore, by using the recording format shown in FIGS. 1 and 2, substantial data compression is achieved because several image frames are converted to interframe code signals while, at the same time, an accurate video picture may be produced during special reproducing modes. In the example discussed above, (n−1) interframe code signals are recorded between successive intraframe code signals, and D is the maximum number of image frames that may be recorded in innermost turn T1. In the numerical example discussed herein, n=6. Also, it is appreciated that the number of image frames that may be recorded in the data frames, at least in innermost turn T1, are equal. That is, and consistent with the numerical example discussed above, six image frames are recorded in six data frames.

Figure 3:
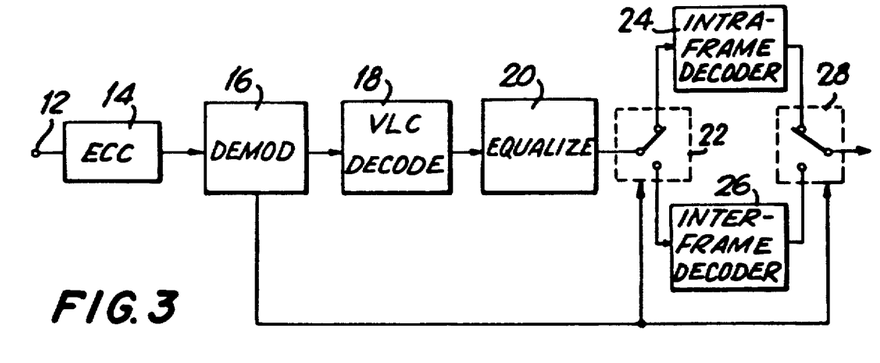
FIG. 3 is a block diagram of apparatus for reproducing the image information having the format shown in FIG. 1.

Turning now to FIG. 3, there is illustrated a block diagram of reproducing apparatus that may be employed to reproduce the image information recorded in the format shown in FIGS. 1 and 2. The intraframe and interframe code signals reproduced from medium 10 ar ®supplied, in the same digital form in which they were recorded, to input terminal 12. This input terminal is coupled to a demodulator 16 by way of an error correction code (ECC) processor 14. The ECC processor is conventional and is adapted to correct errors that may be detected and that are correctable. Demodulator 16, which is compatible with the modulating techniques that may have been used to record the code signals, such as MFM modulation, 1,7 modulation, etc., is coupled to a variable length coding decoder circuit 18. Since the information represented by an interframe code signal is substantially less than the information represented by an intraframe code signal, variable length coding preferably is employed as an efficient encoding implementation. VLC decoder 18 is compatible with the variable length coder and converts the variable length code signal to digital codes of constant lengths.

VLC decoder 18 is coupled to an equalizer 20 which carries out equalization to compensate for the nonlinear quantization used during recording. Quantization for which equalizer 20 is used is described in aforementioned U.S. Pat. No. 4,707,738. The output of equalizer 20 is coupled by way of a change-over switch 22 either to an intraframe decoder 24 or an interframe decoder 26. Change-over switch 22 is coupled to demodulator 16 which controls the coupling of the change-over switch.

Intraframe decoder 24 and interframe decoder 26 may be of the type described in the aforementioned patent, and each is adapted to recover the original image information. An output switch 28 selectively couples either intraframe decoder 24 or interframe decoder 26 to an output terminal to supply a frame of image information to a suitable device, such as a display.

Demodulator 16 is adapted to determine whether an intraframe code signal F1 or an interframe code signal F2-F6 is reproduced from medium 10. The setting of change-over switch 22 is controlled as a function of whether the intraframe or interframe code signal is in the process of being reproduced. For example, each code signal may have an identifying code appended thereto; and demodulator 16 may detect the identifying code to control change-over switch 22 accordingly. Alternatively, the intraframe code signal may be detected, as by detecting an inherent characteristic therein, a suitable ID code associated therewith, etc., and then change-over switch 22 may be controlled to couple equalizer 20 to interframe decoder 26. After a predetermined number of interframe code signals have been a recovered by demodulator 16, for example, after five interframe code signals have been recovered, change-over switch 22 then may be controlled to couple equalizer 20 to intraframe decoder 24. Thus, the intraframe or interframe decoder is coupled to equalizer 20 to decode the intraframe code signal when that signal is reproduced or to decode the interframe code signals when those signals are reproduced.

Figure 4:
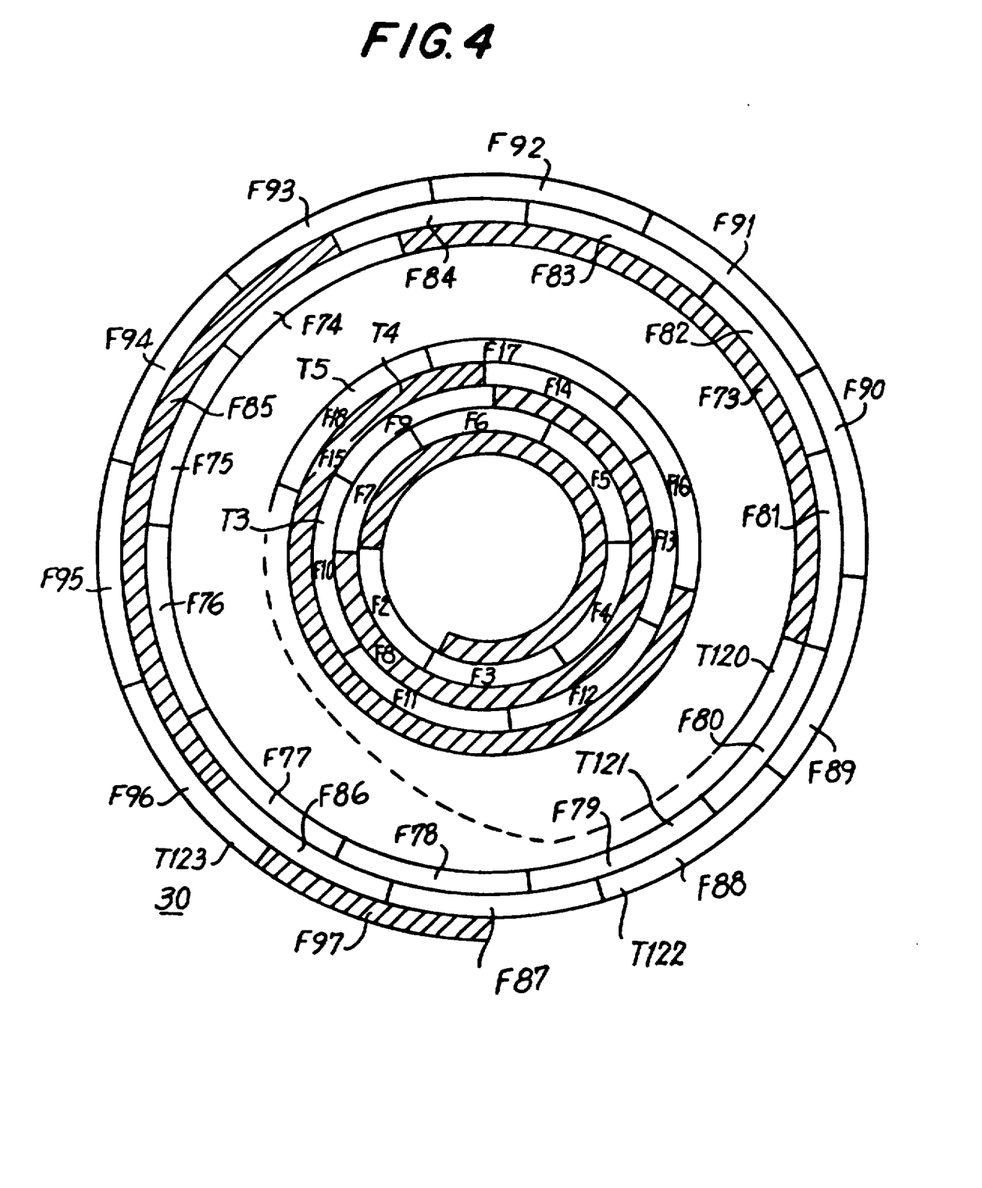
FIG. 4 is a schematic representation of a record medium having image information recorded thereon in accordance with another embodiment of the present invention.

Turning now to FIG. 4, a schematic representation of a record medium 30 having image information recorded thereon in accordance with another embodiment of the present invention is illustrated. Here, intraframe and interframe code signals are recorded in successive turns T1, T2, T3, ... T120, T121, T122, etc. of a spiral track. Alternatively, the code signals may be recorded in concentric circular tracks. While the intraframe and interframe code signals are produced in the same way as the intraframe and interframe code signals of FIGS. 1 and 2, the embodiment of FIG. 4 illustrates the recording of a variable number m of interframe code signals between successive intraframe code signals. Particularly, m varies as a function of the radius of the turn in which the code signals are recorded. Using the nomenclature discussed above in conjunction with FIGS. 1 and 2, the embodiment shown in FIG. 4 may be thought of as recording (n−1) interframe code signals between successive intraframe code signals, where n increases as the radius of the turn in which those code signals are recorded likewise increases.

By recording the code signals at substantially constant linear velocity, it is recognized that the length of an innermost turn is far less than the length of an outermost turn on medium 30. In the embodiment described herein, approximately 3.93 data frames may be recorded in a complete turn of the innermost track and approximately 9.09 data frames may be recorded in the outermost turn. Accordingly, if one intraframe code signal is recorded in each turn, then the number of interframe code signals which may be recorded thereafter until the occurrence of the next intraframe code signal varies as a function of the radius of the turn.

Figure 5:
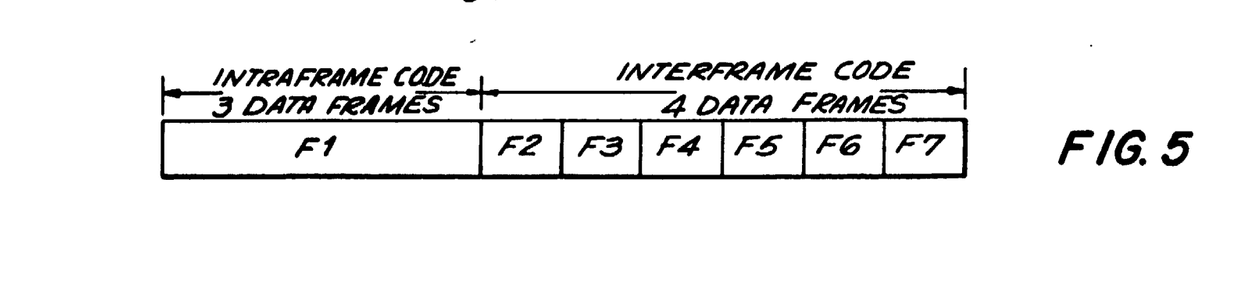
FIG. 5 is a schematic representation of the recording format used to record the image information of FIG. 4.

For example, and with reference to FIG. 5, let it be assumed that a basic set of intraframe and interframe code signals is comprised of seven data frames. By reason of the greater data compression attained by interframe encoding, the intraframe code signal F1 ma be recorded in three data frames and the six succeeding interframe code signals F2, F3, ... F6, F7 may be recorded in the next-following four data frames. However, since the innermost turn has a capacity of approximately 3.93 data frames, it is appreciated that the intraframe code signal F1 is recorded in the innermost turn and only a portion of the next-following interframe code signals complete this innermost turn. Indeed, in the example illustrated in FIG. 4, intraframe code signal F1 followed by interframe code signal F2 and a small portion of interframe code signal F3 all are recorded in innermost turn T1. The remainder of interframe code signal F3 together with interframe code signals F4-F7 are recorded in turn T2. Following interframe code signal F7, the next intraframe code signal F8 is recorded; and it is seen that the beginning of intraframe code signal F8 is angularly delayed from the end of the preceding intraframe code signal F1. As viewed in FIG. 4, intraframe code signals F1, F8, F15, and so on, are recorded proximate each other such that the end of one intraframe code signal angularly precedes the beginning of the next succeeding intraframe code signal, and the next succeeding intraframe code signal is recorded in the next-following turn on medium 30.

As the radius of the turn in which the code signals are recorded increases, the number of interframe code signals included in the basic set of intraframe and interframe code signals likewise increases. This is represented in FIG. 4 by the recording of interframe code signals F74-F84 in tracks T120 and T121 separating successive intraframe code signals F73 and F85. Thus, in tracks T120 and T121, m=(n−1)=11. Hence, a twelve-frame set of compressed image data may be recorded in tracks T120 and T121, comprised of intraframe code signal F73 followed by interframe code signals F74-F84.

In one example of this embodiment, the intraframe code signal is recorded in three data frames in each turn. In an alternative example, since constant linear velocity results in a reduction in the angular velocity of medium 30 as code signals are recorded/reproduced in the outer turns, the timing of the digital signals which are recorded in these turns is such that the intraframe code signal may be recorded in only 1.5 data frames. Thus, whereas the intraframe code signals are recorded in three data frames in the inner turns, the intraframe code signals are recorded in 1.5 data frames in the outer turns. Nevertheless, even in the outer turns, the beginning of the next-following intraframe code signal is angularly delayed from the end of the next preceding intraframe code signal which is recorded in the next preceding turn, and these successive intraframe code signals are recorded proximate each other. FIG. 4 illustrates that the beginning of intraframe code signal F85 is angularly delayed from and proximate to the end of preceding intraframe code signal F73 when medium 30 rotates in the direction represented by the arrow.

From FIG. 4, it is appreciated that intraframe code signals are recorded at locations proximate each other in successive turns. This facilitates good picture reproduction when the code signals recorded on medium 30 are reproduced in special modes, particularly the search mode. As will be described in greater detail below, in a high speed search mode, the inner turns may be scanned such that the pick-up head reproduces intraframe code signal F1 from turn T1 and then, at the completion of this intraframe code signal, the head jumps to turn T2 to play back intraframe code signal F8. Thereafter, at the completion of intraframe code signal F8 when the head has advanced to turn T3, it jumps to turn T4 to reproduce intraframe code signal F15, and so on. Likewise, when the outer turns are scanned, the pick-up head may reproduce intraframe code signal F73 from turn T120 and then, at the completion of this intraframe code signal, the head jumps to turn T121 to reproduce intraframe code signal F85. Likewise, at the completion of intraframe code signal F85, the head jumps to turn T123 to reproduce intraframe code signal F97, and so on. Thus, by jumping from turn to turn, the pick-up head scans substantially only the intraframe code signals by reason of the locations in which those intraframe code signals are recorded. The head need not scan several interframe code signals until an intraframe code signal next is reached during this high speed search mode. Consequently, since video images may be reproduced satisfactorily simply from the intraframe code signals, satisfactory images are displayed during the high speed search mode wherein the pick-up head is moved radially outward at a rate greater than the radial movement of the head during a normal reproducing mode.

While FIG. 4 illustrates the recording of intraframe code signals separated by several interframe code signals in successive turns of a spiral track, it is readily appreciated that the intraframe and interframe code signals may be recorded in discrete circular tracks. However, the spiral track is preferred because the head may be moved radially in a continuous manner rather than in discrete track-to-track jumps.

From the foregoing discussion, it is appreciated that an integral number of image frames is recorded in the same number of data frames on medium 30. For example, in the innermost turns, seven image frames are recorded in seven data frames, with image frame F1 recorded as an intraframe code signal and image frames F2–F7 recorded as interframe code signals. In the outer turns of medium 30, twelve image frames are recorded in twelve data frames, with image frame F73 recorded as an intraframe code signal and image frames F74–F84 recorded as interframe code signals. Furthermore, the intraframe code signal is recorded in plural data frames, whereas a lesser number of data frames are used to accommodate the interframe code signals than there are frames of interframe code signals. For example, and as shown in FIG. 5, in the innermost turns, six interframe code signals are recorded in four data frames. Hence, each image frame of data is data compressed such that the interframe code signal representative thereof is of a length less than a data frame.

Figure 6:
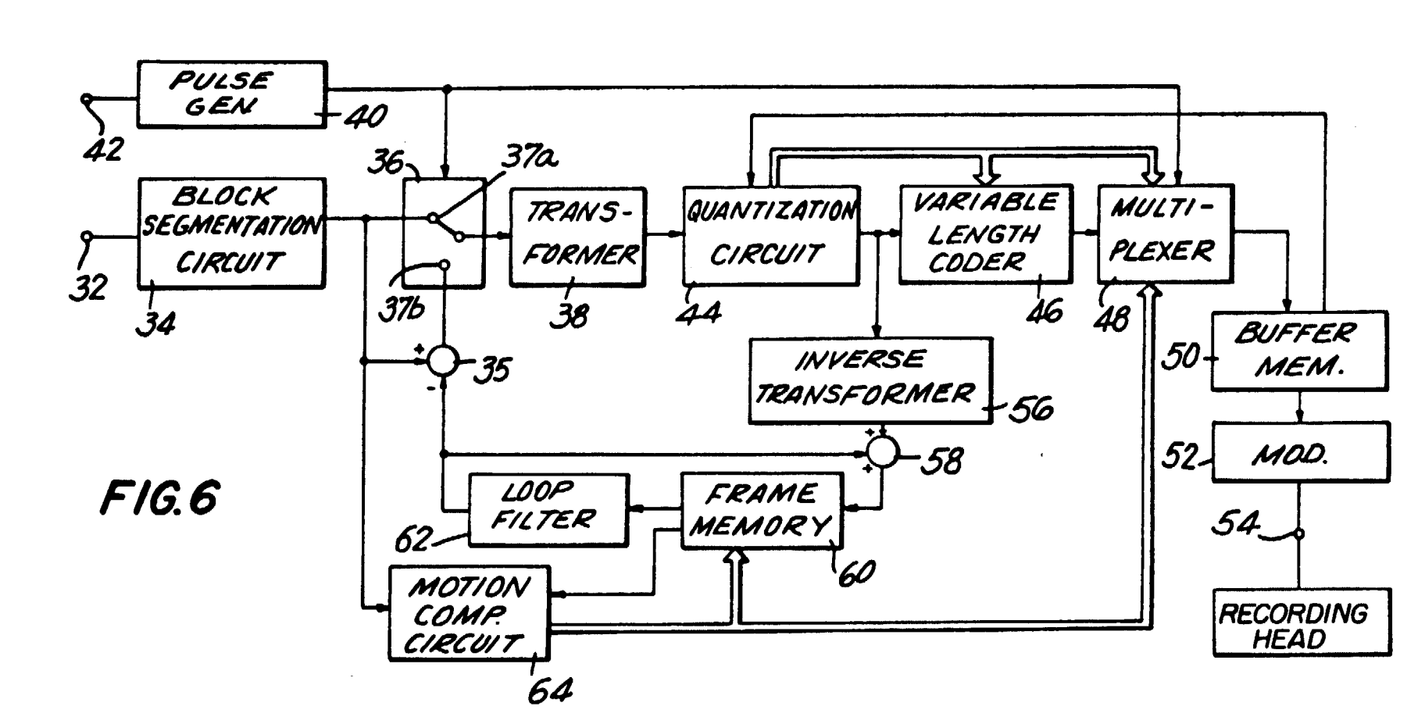
FIG. 6 is a block diagram of apparatus for recording the image information on the record medium shown in FIG. 4.

Turning now to FIG. 6, there is illustrated a block diagram of apparatus for recording the image information on record medium 30 with the recording format shown in FIGS. 4 and 5. It is appreciated that the recording apparatus of FIG. 6 may be used to prepare a master disk from which a mother is made to manufacture copies of CD-ROM's. Alternatively, the recording apparatus may be used directly to record image data magnetically on a magnetic disk. The block diagram shown in FIG. 6 is adapted to carry out the adaptive coding process described in aforementioned U.S. Pat. No. 4,707,738.

The illustrated apparatus is comprised of a block segmentation circuit 34, a discrete cosine transformer 38, a quantization circuit 44, an image difference circuit 45, a variable length coding circuit 46, a buffer memory 50 and a modulator 52. In addition, a switching circuit 36 controlled by a pulse generator 40 is adapted to select either intraframe or interframe encoding of image data. Block segmentation circuit 34 is coupled to an input terminal 32 and is adapted to receive digital information representing an image. This digital information is referred to herein as image data. This image data is not interlaced data and thus represents one complete frame of video information. It is appreciated that this image data may be comprised of monochromatic data or color information.

Block segmentation circuit 34 is adapted to divide the image frame constituted by the image data supplied to input terminal 32 into (a×a) blocks, such as (8×8), (16×16), etc. The block-segmented image data produced by circuit 34 is coupled to discrete cosine transformer 38 by way of switching circuit 36. For convenience, the switching circuit is illustrated as an electromechanical switch having a movable contact adapted to select the information supplied to fixed contacts 37a and 37b. The particular fixed contact selected by the movable contact is controlled by a change-over pulse produced by pulse generator 40, to be described.

Discrete cosine transformer 38 is coupled to the output of switching circuit 36 and is adapted to produce a discrete cosine transformation of the block-segmented image data supplied thereto. The discrete cosine transformer carries out a two-dimensional cosine transformation and produces coefficient data as described more particularly in the aforementioned patent. This coefficient data is coupled to quantizing circuit 44 which is adapted to reduce the dynamic range of the discrete cosine transformation coefficients. The quantizing circuit may be thought of as producing a "coarse" representation of the coefficient data produced by the discrete cosine transformation circuit. For example, quantizing circuit 44 may function to change the dynamic range of the discrete cosine transformation coefficient data between eight bits and four bits.

The output of quantizing circuit 44 is coupled to variable length coder 46 and also to image difference circuit 45. The variable length coder is adapted to produce a code signal whose length varies as a function of the information represented by that signal. It is appreciated that if the quantized signal produced by quantizing circuit 44 represents a lesser amount of information, the length of that quantized signal may be reduced relative to the length of the quantized signal which represents a greater amount of information. Variable length coder 46 carries out this function and thus minimizes the amount of digital data that is needed to represent image information. The output of variable length coder 46 is coupled to and stored in buffer memory 50 by way of a multiplexer 48. The purpose of this multiplexer will become apparent from further description of the illustrated apparatus.

Stored digital information that has been data compressed as a result of discrete cosine transformation circuit 38, quantizing circuit 44 and variable length coder 46 is read from the buffer memory 50 and supplied to modulator 52. The modulator is adapted to modulate the digital data to a form compatible with the record medium on which that data is recorded. As an example, digital modulating techniques, such as EFM (wherein an 8-bit data character is converted into a 14-bit character) is carried out by modulator 52; and the modulated digital information is transmitted to an output terminal 54 for recording. Although not shown, a suitable error correcting circuit may be coupled to the output of the modulator, such as to output terminal 54, to provide conventional error detection/correction encoding of the modulated digital signal. This error corrected encoded information is supplied to a suitable recording head.

Image difference circuit 45 is adapted to supply to discrete cosine transformation circuit 38 by way of switching circuit 36 digital information which represents the difference between the image frame then being supplied to input terminal 32 and the next preceding image frame. It is appreciated that this difference information, by itself, cannot be converted to a useful video display. However, when added to a preceding image, the new video image may be displayed with high quality. It will be recognized, therefore, that image difference circuit 45 is instrumental in producing the interframe code signal.

As illustrated in FIG. 6, the image difference circuit is comprised of an inverse transformation circuit 56, a frame memory 60 and a difference circuit 35. Inverse transformation circuit 56 is coupled to the output of quantizing circuit 44 and is adapted to carry out the inverse of discrete cosine transformation circuit 38. Thus, the signal produced by the inverse transformation circuit is quite similar to the signal which had just been supplied by switching circuit 36 to discrete cosine transformation circuit 38.

The output of inverse transformation circuit 56 is coupled by way of a summing circuit 58 to frame memory 60. The frame memory is adapted to store image data representing the previous image frame which had been supplied to input terminal 32. It will be appreciated that, when the illustrated apparatus produces an interframe code signal (to be described), the information produced by inverse transformation circuit 56 merely represents the difference between successive image frames. The purpose of summing circuit 58 is to sum this difference information with the previously stored image data to produce image data representing the most recent image frame. Thus, the output of inverse transformation circuit 56 is summed with the image data stored previously in frame memory 60, this image data being read out therefrom, filtered by a loop filter 62 and fed back to summing circuit 58.

As mentioned above, quantizing circuit 44 functions to reduce the dynamic range of the digital data supplied thereto. This coarsely quantized information may comprise the image data stored in frame 60. The purpose of loop filter 62 is to filter quantization noise in such coarse image data to produce a more acceptable representation of an image frame. The filtered image data read from frame memory 60 is summed with the output of inverse transformation circuit 56 to produce image data representing the most recent image frame. It is this image data which is stored in frame memory 60.

The output of loop filter 62 also is supplied to difference circuit 35. As shown in FIG. 6, another input of difference circuit 35 is coupled to the output of block segmentation circuit 34. Thus, difference circuit 35 is adapted to produce digital difference data representing the difference between the image frame then being supplied to input terminal 32 and the previous image frame stored in frame memory 60 This difference data is coupled to contact 37b of switching circuit 36.

The variable length code signal produced by variable length coder 46 may not be sufficient, in and of itself, for the accurate reproduction of an acceptable viewable image. Accordingly, multiplexer 48 serves to add to this variable length code signal additional information from which an accurate video picture may be reproduced. This additional information includes data representing the quantizing step of quantizing circuit 44. As illustrated, this data is supplied to multiplexer 48 and it also is supplied to variable length coder 46 to control, at least in part, the length of the code signal produced thereby.

Furthermore, data representing motion that may be present between two successive images also is supplied to multiplexer 48. Motion is sensed by a motion compensating circuit 64 having one input coupled to block segmentation circuit 34 and another input coupled to frame memory 60. The motion compensating circuit may be of the type described in U.S. Pat. No. 4,777,530. Image information representing the image presently received at input terminal 32 is compared to image information read out from frame memory 60; and the difference therebetween is indicative of motion. Motion compensator 64 is adapted to produce a motion vector; and this motion vector is supplied to frame memory 60 and also to multiplexer 48. This motion vector, together with data representing the quantizing step, when combined with the variable length code, is sufficient, when reproduced, to generate an image of high quality.

It will be appreciated that switching circuit 36 determines whether an intraframe code signal or an interframe code signal is produced. It will be appreciated that discrete cosine transformation circuit 38, quantizing circuit 44, variable length coder 46 and multiplexer 48 are used to produce both the intraframe code signal and the interframe code signal. When switching circuit 36 couples block segmentation circuit 34 to discrete cosine transformation circuit 38, the intraframe code signal is produced. Conversely, when switching circuit 36 couples the digital difference data produced by difference circuit 35 to discrete cosine transformation circuit 38, the interframe code signal is produced. The switching condition of switching circuit 36 is controlled by pulse generator 40 which, in turn, receives a control signal via an input 42. For example, switching circuit 36 may couple block segmentation circuit 34 to discrete cosine transformation circuit 38 when a "1" is produced by pulse generator 40. Conversely, switching circuit 36 may couple difference circuit 35 to the discrete cosine transformation circuit when pulse generator 40 produces a "0". The control signal applied to input 42 may be a periodic signal whose period changes as a function of the radius of the turn then being scanned by the recording head coupled to output terminal 54. Furthermore, the output of pulse generator 40 is coupled to multiplexer 48 and functions as identifying data to identify whether the signal supplied to the multiplexer from variable length coder 46 is an intraframe code signal or an interframe code signal. For example, a "1" may identify the intraframe code signal and a "0" may identify the interframe code signal.

In the interest of brevity, further description of the encoding apparatus illustrated in FIG. 6 is not provided. It will be appreciated, however, that several different types of variable length coding operations may be carried out by variable length coder 46. For example, the coder may execute a run length coding process, a Huffman coding process, or the like.

Buffer memory 50 advantageously is adapted to limit the rate at which data is supplied to modulator 52 such that the rate at which digital image data is recorded on the record medium does not exceed the designed transmission rate. FIG. 6 illustrates feedback from the buffer memory adapted to control the quantizing circuit to carry out coarse quantization when a large amount of data is stored in the buffer memory and, conversely, to carry out fine quantization when a relatively lesser amount of data is stored in buffer memory 50. Thus, the quantization step tends to balance the amount of data supplied to the recording head.

Figure 7:
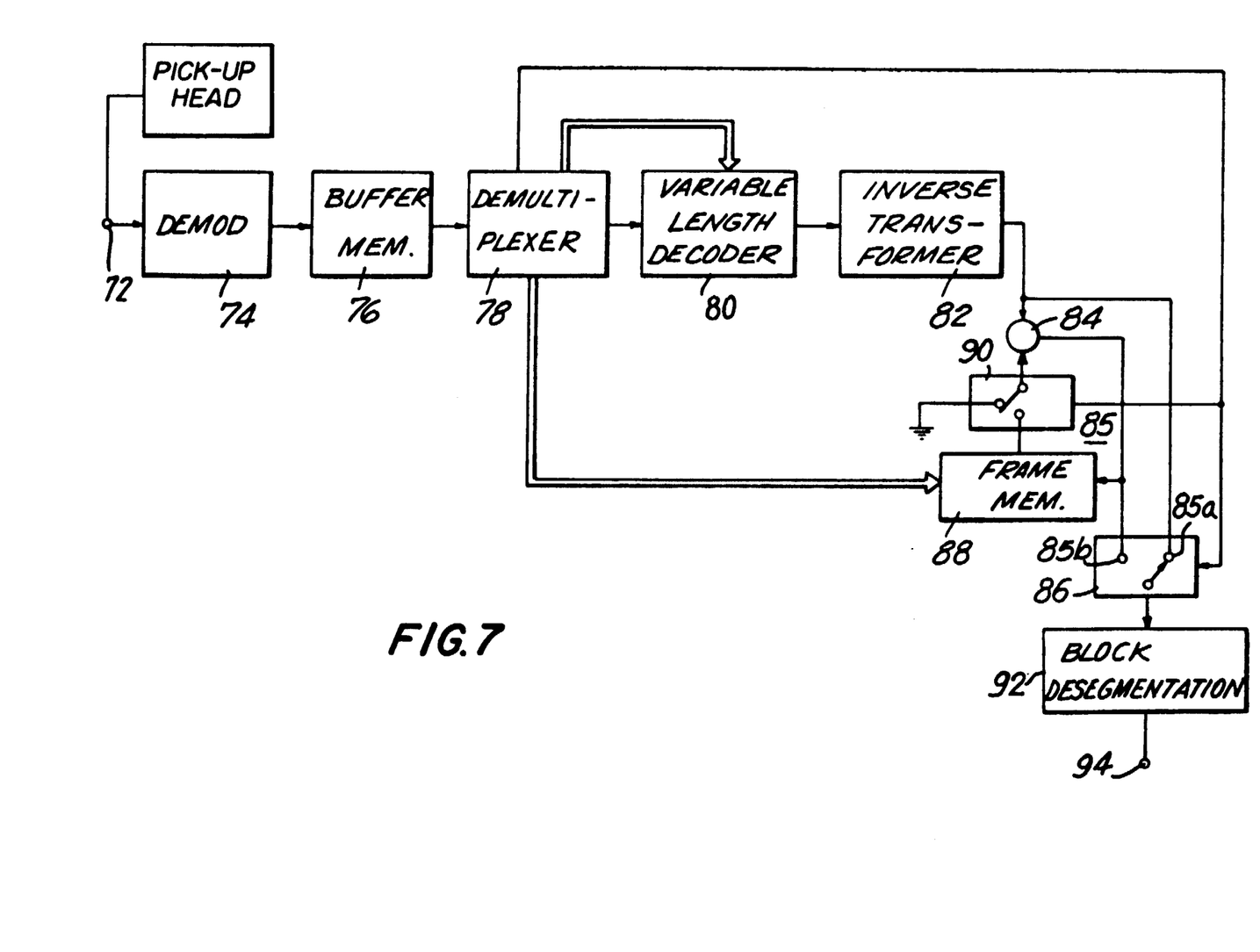
FIG. 7 is a block diagram of apparatus for reproducing the image information from the record medium shown in FIG. 4.

FIG. 7 is a block diagram of apparatus adapted to reproduce the intraframe and interframe code signals recorded by the apparatus of FIG. 6 on medium 30 shown in FIG. 4. It will be appreciated that the medium with which the apparatus shown in FIG. 7 is used may be a CD-ROM or a magnetic disk. Of course, these two media are not simply interchangeable. It is assumed that the appropriate reproducing apparatus, including the proper pick-up head, is used. The reproducing apparatus of FIG. 7 is described in U.S. Pat. No. 4,707,738 and, therefore, need not be described herein in great detail. The reproducing apparatus is comprised of a demodulator 74, a buffer memory 76, a demultiplexer 78, a variable length decoder 80, an inverse transformation circuit 82, a difference compensating circuit 85 and a block desegmentation circuit 92. Demodulator 74 is coupled to an input terminal 72 which is adapted to be supplied with intraframe and interframe code signals reproduced from medium 30. Although not shown, it will be appreciated that an error correction circuit, such as an ECC circuit, may be coupled to input terminal 72 to carry out an error correction operation on the data reproduced from the medium.

Demodulator 74 is compatible with modulator 52 and supplies demodulated digital signals to buffer memory 76. The buffer memory is adapted to store the demodulated digital signals and to read out those signals to demultiplexer 78. The operation of the demultiplexer is inverse to that of multiplexer 48 and serves to separate the discrete cosine transformation coefficient data which had been quantized and coded by variable length coder 46, and also to separate the motion vector which had been produced by motion compensating circuit 64. Still further, the intraframe/interframe identifying data which had been provided by pulse generator 40 is separated by the demultiplexer.

The variable length encoded discrete cosine coefficient data separated by multiplexer 78 is coupled to variable length decoder 80. The variable length decoder is adapted to decode that coefficient data and, depending upon the quantization step data separated by demultiplexer 78, the dynamic range of that discrete cosine coefficient data is restored. Thus, the output of variable length decoder 80 is substantially similar to the digital coefficient data produced by discrete cosine transformation circuit 38. This data is used by inverse transformation circuit 82, which functions in a manner complementary to that of discrete cosine transformation circuit 38, to recover the original block-segmented image data or the original difference data, depending upon whether the intraframe or interframe code signal had been reproduced.

The output of inverse transformation circuit 82 is coupled to block desegmentation circuit 92 by way of a change-over switch 86. This change-over switch is similar to aforedescribed switching circuit 36 and is illustrated as an electromechanical switch having a movable contact coupled to the block desegmentation circuit and adapted to be connected either to fixed contact 85a (to which the inverse transformation circuit is connected) or to fixed contact 85b. When an intraframe code signal is supplied to input terminal 72, switching circuit 86 couples inverse transformation circuit 82 directly to block desegmentation circuit 92. However, when an interframe code signal is supplied to input terminal 72, change-over switch 86 couples difference compensating circuit 85 (which is connected to fixed contact 85b) to block desegmentation circuit 92. Change-over switch 86 is supplied with a control input derived from the intraframe/interframe identifying data separated by demultiplexer 78.

Difference compensating circuit 85 is comprised of a frame memory 88 and a summing circuit 84. Frame memory 88 is adapted to store image data representing the preceding image frame that had been reproduced from medium 30. In this regard, the frame memory is supplied with the motion vector separated by demultiplexer 78 and uses this motion vector in substantially the same way as frame memory 60 (shown in FIG. 6). Image data representing an image frame is supplied to the frame memory from the output of summing circuit 84. The output of the frame memory is coupled to the summing circuit by way of a switching circuit 90. The switching circuit also is supplied with a neutral signal input, represented herein as ground, and is controlled by the intraframe/interframe identifying data separated by demultiplexer 78. It will be appreciated that, when an interframe code signal is supplied to input terminal 72, switching circuit 90 connects the output of frame memory 88 to summing circuit 84. However, when an intraframe code signal is supplied to the input terminal, switching circuit 90 supplies the neutral signal to the summing circuit.

In operation, inverse transformation circuit 82 functions to produce either an intraframe code signal or an interframe code signal, depending upon which of these code signals is reproduced from medium 30, in the manner described by U.S. Pat. No. 4,707,738. Thus, the output of the inverse transformation circuit is substantially the same as the input signal which had been supplied to discrete cosine transformation circuit 38 during recording. Let it be assumed that this output of the inverse transformation circuit is an intraframe code signal. Accordingly, this intraframe code signal is summed with a neutral signal in summing circuit 84 and stored in frame memory 88. Thus, image data representing this image frame is stored in the frame memory. This image data also is supplied to block desegmentation circuit 92 which functions to desegmentize the image data and supply a frame of video information to output terminal 94. This frame of video information may be displayed on a suitable display.

The next-following code signal to be reproduced from medium 30 is an interframe code signal, as is apparent from FIG. 4. The recovered and decoded image difference signal produced at the output of inverse transformation circuit 82 is substantially the same as the image difference signal which had been supplied by difference circuit 35 to discrete cosine transformation circuit 38 during a recording operation. At this time, change-over switch 86 and switching circuit 90 are controlled such that switching circuit 90 couples the output of frame memory 88 to summing circuit 84 and change-over switch 86 couples the output of summing circuit 84 to block desegmentation circuit 92. Now, the image frame which had been stored in the frame memory is read out and summed with the image difference signal produced by inverse transformation circuit 82. As a result, a new image frame of image data is produced by the summing circuit; and this new image frame is stored in frame memory 88 and also supplied to block desegmentation circuit 92. Hence, this new image frame of image data may be displayed on the display device coupled to output terminal 94.

As succeeding interframe code signals are reproduced from medium 30 and supplied to input terminal 72, the foregoing operation is repeated. Thus, the contents of frame memory 88 are updated in response to each image frame reproduced from the medium, whether that image frame is encoded as an intraframe or interframe code signal, and this updated image frame is summed with subsequently reproduced interframe code signals to further update the stored image frames. Hence, each reproduced image frame is fully decoded, whether it was reproduced as an intraframe or interframe code signal, and the corresponding image is displayed.

In the embodiment just described, it is assumed that change-over switch 86 and switching circuit 90 are controlled by the intraframe/interframe identifying data separated by demultiplexer 78. Alternate control schemes are contemplated. For example, the inherent characteristics of an intraframe code signal may be detected and then, after an intraframe code signal has been reproduced, a predetermined number m of data frames may be counted during which switch circuits 86 and 90 are controlled to their interframe states. After m interframe code signals have been reproduced, the switch circuits are controlled to their intraframe states. As mentioned above, m varies as a function of the radial position of the pick-up head used to reproduce the code signals from medium 30.

Figures 8, 9A:
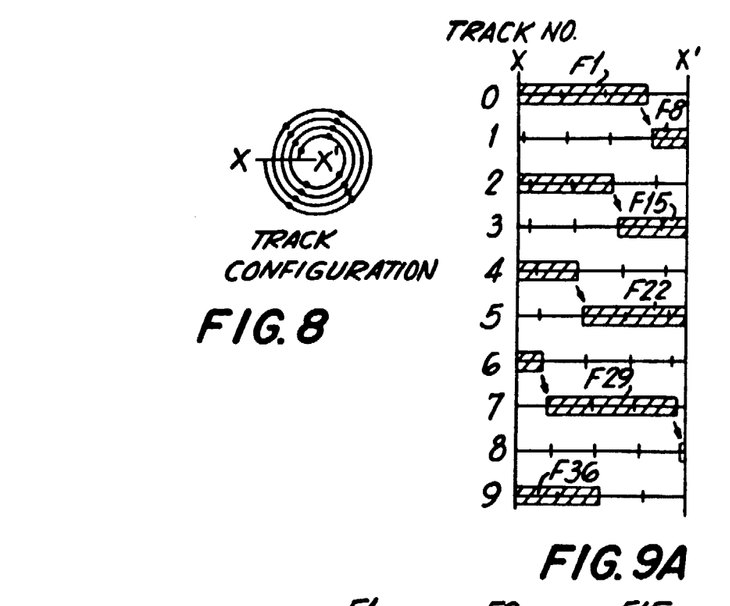
FIG. 8 is a schematic representation of successive turns of information recorded on the record medium and is helpful in understanding the advantages achieved by this invention.
FIGS. 9A-9C are schematic representations of information reproduced from successive turns during a high speed search operation.

The advantages achieved by adopting the recording format illustrated in FIGS. 4 and 5 now will be described in conjunction with FIGS. 8-10. FIG. 8 is a schematic representation of successive inner turns of information recorded on record medium 30. The black dots in each turn represent a data frame. It will be appreciated, therefore, that each turn exhibits a recording capacity on the order of about 3.93 data frames. If each turn is extracted and arrayed linearly, as opposed to the circular configuration shown in FIG. 8, the first ten turns (extending from turn #0 to #9) appear as shown in FIG. 9A. That is, each turn is assumed to extend from point X to point X', whereupon the next turn begins. It is further assumed that turn #0 has recorded therein intraframe code signal F1 in the first three data frames. Thereafter, the next-following interframe code signals F2-F7 are recorded in the next four data frames. From FIG. 9A, it is seen that after the three frames of intraframe code signal F1 are recorded in turn #0, 0.93 data frames remain, and then turn #1 commences with 0.07 data frames, followed by three data frames containing the interframe code signals through F7 and then the next-following intraframe code signal F8 is recorded from the trailing portion of turn #1 through the beginning and at least mid-portion of turn #2. The circular configuration of turns 0-9 is shown in FIG. 4, wherein turn #0 is illustrated as turn T1, turn #1 is illustrated as turn T2, turn #2 is illustrated as turn T3, etc.

FIG. 9A, like FIG. 4, illustrates that the beginning of intraframe code signal F8 is slightly angularly delayed from the end of intraframe code signal F1. That is, the beginning of intraframe code signal F8 in turn #1 is slightly delayed from the end of intraframe code signal F1 in turn #0. Likewise, and as shown in FIGS. 4 and 9A, the beginning of intraframe code signal F15 in turn #3 (turn T4) is slightly delayed from the end of intraframe code signal F8 in turn #2 (turn T3). Since each unit set of data frames in the inner turns is assumed to contain seven image frames (recorded as an intraframe code signal followed by six interframe code signals), it is seen that every seventh image frame is recorded as an intraframe code signal whose beginning in one track is slightly delayed from the end of the preceding intraframe code signal in the preceding track.

Figure 9B:
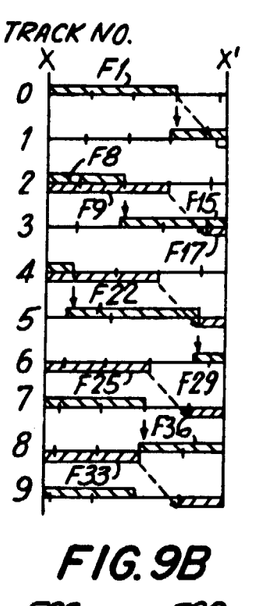
Figure 9C:
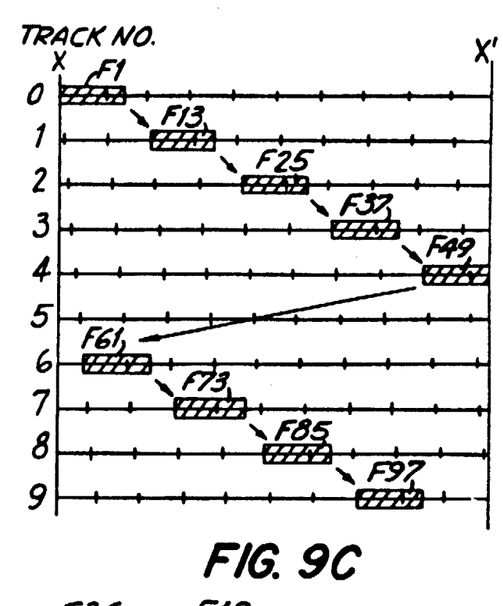

With this recording format, special reproducing modes and particularly the high speed search mode, are readily implemented. When considering the high speed search mode, the pick-up head is moved in the radial direction at a rate faster than its radial movement during normal reproducing modes. In the high speed forward search mode, the pick-up head is moved radially outward. The arrows shown in FIGS. 9A represent this high speed search mode wherein an intraframe code signal in one track is scanned and then, when the end of that intraframe code signal is reached, the pick-up head moves quickly (i.e. "jumps") to the next turn. Because of the slight delay or displacement of the recorded intraframe code signals, as depicted in FIGS. 4 and 9A, the jump of the pick-up head from, for example, turn #0 to turn #1 positions that head at the beginning of the next succeeding intraframe code signal F8. Accordingly, this next intraframe code signal is reproduced and then, when the end of that intraframe code signal is reached in turn #2, the head "jumps" to adjacent turn #3 and is positioned at the beginning of the next succeeding intraframe code signal F15. Accordingly, in the high speed search mode, the pick-up head normally scans primarily only intraframe code signals from which a satisfactory viewable image is reproduced. It is appreciated that the pick-up head normally scans intraframe code signals except for brief durations during which it jumps from one turn to the next and settles at the beginning of the next succeeding intraframe code signal. In the inner turns, the succeeding intraframe code signals ar angularly displaced or delayed by an amount which is smaller than the angular displacement between succeeding intraframe code signals in the outer signals, as will be described and as shown in FIGS. 4 and 9C.

Figure 10A:
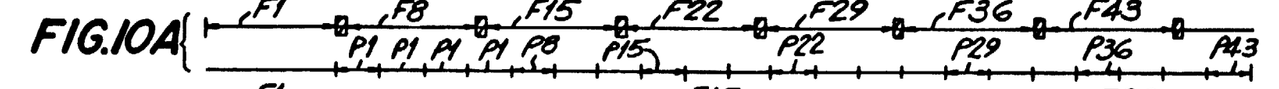
FIGS. 10A-10C are schematic representations of the manner in which video pictures are displayed during the high speed search operation.

FIG. 10A illustrates the head scanning and jumping operation in the upper line thereof and illustrates the image frame which is displayed in the lower line of the FIG. The cross-hatched area in the upper line of FIG. 10A illustrates the brief duration during which the head jumps from one turn to the next and settles at the beginning of the intraframe code signal in that next turn. When intraframe code signal F1 in turn #0 is recovered, it is stored in a suitable memory (as shown in FIG. 7) until the head jumps from turn #0 to turn #1. At that time, represented by the cross-hatched area in the top line of FIG. 10A, a video picture P1 derived from intraframe code signal F1 is reproduced.

While image frame P1 is reproduced, the pick-up head recovers intraframe code signal F8 from turns #1 and #2. Then, the head jumps from turn #2 to turn #3 and recovers intraframe code signal F15. During this track jump, image frame P1 continues to be reproduced until the head settles on turn #3. At that time, image frame P8, which is reconstructed from the recovery of intraframe code signal F8, is displayed. Thus, image frame P8 is displayed while intraframe code signal F15 is recovered from turns #3 and #4. Then, at the completion of intraframe code signal F15, the head jumps from turn #4 to turn #5 to reproduce intraframe code signal F22. Following this track jump, image frame P8 which is reconstructed from recovered interframe code signal F15, is displayed.

Thus, it is seen that, following a track jump by the pick-up head, the image frame which is reconstructed from the previously recovered intraframe code signal is displayed while the next-following intraframe code signal is recovered. Normally, the same image frame is re-displayed for three or four successive image frame times, depending upon when the track jump occurs during the display operation. In the illustrated example, image frame P1 is re-displayed four frame times, image frame P8 is re-displayed three frame times, image frame P15 is re-displayed three frame times and image frame P22 is re-displayed four frame times. In any event, the track jump operation occupies only a brief duration such that every seventh image frame is displayed, resulting in a viewable, animated image of good quality during the high-speed search operation.

The advantages achieved by varying the number m of interframe code signals which are recorded between successive intraframe code signals as the radius of the turn in which those code signals are recorded increases now will be described with reference to FIGS. 9B and 10B. In FIG. 9A, it was assumed that approximately 3.93 frames are recorded in a turn. In FIG. 9B, it is assumed that the radius of the turn has increased, that is, FIG. 9B illustrates the recording of intraframe and interframe code signals in turns which are farther out than those shown in FIG. 9A, and it is assumed that approximately 4.1 frames may be recorded in a complete turn. At this radius, it is desired to let m=8. First, however, a high speed search operation is described for the condition that m=7. In FIG. 9B, the recording of every seventh image frame as an intraframe code signal is represented by cross-hatched areas above each turn (e.g. intraframe code signals F1, F8, F15, F22, etc.), and the recording of every eighth image frame as an intraframe code signal is represented by the cross-hatched area below each turn (e.g. intraframe code signals F1, F9, F17, F25, etc.).

Assuming that every seventh image frame is recorded as an intraframe code signal, it is seen that the beginning of the next-following intraframe code signal is radially advanced relative to the ending of the preceding intraframe code signal. That is, even if the pick-up head could jump instantaneously from, for example, track #0 to track #1, the beginning of intraframe code signal F8 already has passed the instantaneous position of the head by the time the head completes intraframe code signal F1. In the high speed search mode, an image is not produced unless the beginning of the frame in which that image is recorded is scanned. Thus, since the image in frame 8 cannot be reproduced when the pick-up head jumps from track #0 to track #1, intraframe code signal F8 is not used to reconstruct an image frame. Rather, the pick-up head jumps from turn #0 to turn #1; and then when it is determined that the beginning of intraframe code signal F8 cannot be reproduced, the pick-up head jumps from turn #1 to turn #2 and then to turn #3 to await the beginning of intraframe code signal F15. Thus, intraframe code signal F8 is not used to reconstruct the viewable image.

Figures 10B, 10C:
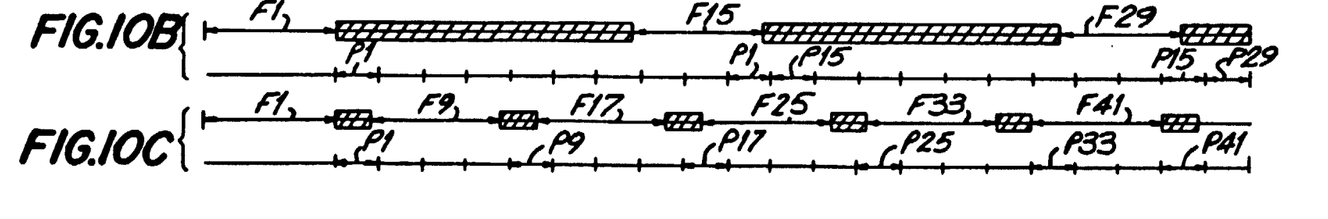

FIG. 10B illustrates this inability of the pick-up head to scan the beginning of intraframe code signal F8 after preceding intraframe code signal F1 had been fully reproduced. In the top line of FIG. 10B, the cross-hatched area represents the time duration required for the pick-up head to jump from one turn to another and then to await the arrival of the beginning of the intraframe code signal in that turn. It is seen, therefore, that when the end of intraframe code signal F1 is reached, the head jumps from turn #0 to turn #1 and then to turn #2 and finally to turn #3 and must await the arrival of the beginning of intraframe code signal F15. All during this duration, image frame P1 is re-displayed. Then, when intraframe code signal F15 of frame 15 is recovered, image frame P1 nevertheless continues to be reproduced until the end of intraframe code signal F15 is reached. Thereafter, image frame P15, which is reconstructed from the recovered intraframe code signal F15, is displayed. Similarly, after the end of intraframe code signal F15 is reached in turn #4, the head jumps to turn #5 and then to turn #6 and awaits the beginning of intraframe code signal F29. During this track jumping and waiting period, as well as during the scanning period of intraframe code signal F29, image frame P15 is re-displayed. It is not until after the head completes its scanning of intraframe code signal F29 that image frame P29 reconstructed therefrom is displayed.

Whereas FIG. 10A illustrates a minimum time duration between the end of one intraframe code and the beginning of another, FIG. 10B illustrates an undesirably large duration therebetween. Furthermore, whereas an image frame is re-displayed three or four frame times in FIG. 10A, it is re-displayed about ten frame times in FIG. 10B. Thus, every fourteenth image frame is displayed rather than every seventh image frame. It is appreciated that significant changes may occur between fourteen image frames; and this may give rise to viewable images of poorer quality during a high speed search mode. Furthermore, it is not desirable to vary the number of frame times that a particular image frame is re-displayed in so drastic a manner as will occur when the pick-up head moves from an inner track to an outer track. That is, whereas an image frame is re-displayed three or four times when an inner turn is scanned, an image frame is re-displayed about ten times when a turn of greater radius is scanned. It is preferred that an image frame be re-displayed approximately the same number of times during a high speed search operation, whether that image frame is reconstructed from signals recorded in an inner turn or an outer turn. This generally constant number of re-displays of an image frame is achieved by the preferred embodiment of this invention.

Referring again to FIG. 9B, when the radius of the turns has increased such that, for example, approximately 4.1 data frames may be recorded, it is preferred to encode each eighth image frame (as opposed to encoding each seventh image frame) as an intraframe code signal. Thus, after recovering intraframe code signal F1, the head jumps to turn #1 and need await for only a brief duration for the commencement of intraframe code signal F9. Likewise, after completing the scanning of intraframe code signal F9, the head jumps from turn #2 to turn #3 and awaits, for only a brief time duration, the commencement of intraframe code signal F17.

FIG. 10C illustrates this advantage of increasing the number of interframe code signals recorded between successive intraframe code signals as the radius of the turns in which those code signals are recorded increases. In the top line of FIG. 10C, the cross-hatched area represents the time duration for the head to jump from one turn to another and then await the beginning of the interframe code signal. As shown, only a relatively brief interval expires from the end of intraframe code signal F1 to the beginning of the next intraframe code signal F9. Image frame P1, reconstructed from intraframe code signal F1, first is displayed after intraframe code signal F1 has been scanned; and image frame P1 is re-displayed while intraframe code signal F9 is recovered. Then, after intraframe code signal F9 has been fully scanned, image frame P9 (reconstructed therefrom) is re-displayed while the head jumps to and scans intraframe code signal F17.

A comparison of FIGS. 10A and 10C indicates that an image frame is re-displayed approximately the same number of times for inner turns and for outer turns. This is because the period separating intraframe code signals is increased as the radius of the turn in which those coded signals are recorded increases.

FIG. 9C illustrates head-jumping from track to track with minimal time duration between the scanning of the end of one intraframe code signal and the occurrence of the beginning of the next intraframe code signal. In FIG. 9C, it is assumed that each turn has a recording capacity of approximately 9.9 frames. Furthermore, since the image information is recorded at substantially constant linear velocity, it is appreciated that the angular speed of medium 30 is reduced as the head moves radially outward. This, in turn, permits an intraframe code signal to be recorded in a smaller number of data frames, such as 1.5 data frames. In the turns represented by FIG. 9C, it is assumed that every twelfth image frame is encoded as an intraframe code signal and, thus, m=11. By utilizing the time duration that the head jumps from the end of an intraframe code signal in one turn to the beginning of an intraframe code signal in the next, the number of times that an image frame need be re-displayed remains about the same when the head scans image data in the outer turns as when the head scans image data in the inner turns.

A general equation can be empirically derived to determine the number of image frames which constitute a unit set of intraframe and interframe code signals recorded in a turn. The number of image frames i may be determined as follows:

$$i = w + c + t$$

where
 w = the number of data frames needed to record the intraframe code signal;
 c is the maximum number of image frames that can be recorded in the turn under consideration; and
 t is the number of data frames needed for the head to jump from one track to the next and then begin scanning an intraframe code signal.

In accordance with the preceding equation, if i is calculated as a decimal, it is raised to the next higher integral unit.

Using this empirical equation, for an inner turn in which approximately 3.93 frames may be recorded in a turn, $w=3$, $c=3.93$ and t is negligible. Hence, $i=6.93$, or seven image frames.

For turns having recording capacities of 4.1 frames, $w=3$, $c=4.1$ and t is negligible. As a result, $i=7.1$, and this is increased to eight image frames.

Finally, for outer turns having a recording capacity of approximately 9.09 frames, $w=1.5$, $c=9.09$ and t is approximately 0.5. As a result, $i=11.09$; and this is increased to twelve image frames.

While the present invention has been particularly shown and described with reference to preferred embodiments, it will be readily appreciated by those of ordinary skill in the art that various changes and modifications may be made without departing from the spirit and scope of the invention. For example, the special reproducing mode which has been discussed herein has been the high speed forward search mode. The present invention is equally applicable to a high speed reverse search mode. As another alternative, and with reference to FIG. 7, the selection of an intraframe or interframe decoding operation has been described above as being determined by identifying data separated from the reproduced code signals by demultiplexer 78. Alternatively, the radial position of the pick-up head may be sensed and used to determine whether an intraframe decoding operation should be changed over from an interframe decoding operation. For example, the number of interframe code signals which are decoded before an intraframe decoding operation is effected may be determined by the radial position of the head.

It is intended that the appended claims be interpreted as including the embodiments specifically described herein, those modifications which have been mentioned or implied, and all equivalents thereto.

What is claimed is:

1. A method of recording image data in successive tracks on a rotatable medium driven at substantially constant linear velocity, comprising: receiving successive image frames of said image data; encoding said image frames by converting a first image frame of image data to an intraframe code signal and converting (n−1) succeeding image frames of image data to (n−1) interframe code signals, wherein n is the maximum number of image frames recordable in an innermost track of said medium driven at substantially constant linear velocity; and recording at least one intraframe code signal and at least (n−1) interframe code signals in each track.

2. The method of claim 1 wherein the step of recording comprises recording (n−1) interframe code signals between successive intraframe code signals.

3. The method of claim 2 wherein said successive tracks comprise a spiral track of successive turns and the intraframe and interframe code signals are recorded in said spiral track.

4. The method of claim 1 wherein each track is comprised of a number of data frames, and the step of recording comprises recording an intraframe code signal in plural data frames and recording (n−1) interframe code signals in less than (n−1) data frames.

5. The method of claim 1 wherein the step of recording comprises recording intraframe code signals at locations adjacent each other in successive tracks.

6. The method of claim 1 wherein the step of recording comprises recording more than (n−1) interframe code signals between successive intraframe code signals as the radius of the track in which said interframe code signals are recorded increases.

7. The method of claim 6 wherein the step of recording further comprises recording only one intraframe code signal in a track.

8. The method of claim 7 wherein said successive tracks comprise a spiral track of successive turns.

9. The method of claim 8 wherein the step of recording comprises recording an integral number of encoded image frames in an equal number of data frames, with said intraframe code signal being recorded in plural data frames in a turn and the remaining data frames in that turn having recorded therein interframe code signals which follow said intraframe code signal.

10. The method of claim 1 wherein the step of converting an image frame of image data to an interframe code signal comprises comparing one frame of image data to a preceding frame of image data and encoding the differences therebetween such that said interframe code signal represents said differences.

11. A method of reproducing image data from successive turns on a rotatable record medium driven at substantially constant linear velocity, wherein said image data has been recorded as an intraframe code signal representing an image frame followed by a number of successive interframe code signals representing an equal number of successive image frames, with said number of interframe code signals in a turn being at least as large as the capacity of interframe code signals recordable in an innermost turn, said method comprising: reproducing the intraframe and interframe code signals in each turn; coupling the reproduced code signals to an intraframe decoder to recover image data therefrom; coupling the reproduced code signals to an interframe decoder to recover image data therefrom; sensing if an intraframe or interframe code signal is reproduced; and changing over the reproduced code signals between the intraframe decoder and the interframe decoder as a function of whether the intraframe or interframe code signal is sensed as being reproduced.

12. The method of claim 11 wherein a predetermined number of interframe code signals had been recorded between successive intraframe code signals, and wherein the step of changing over the reproduced code signals between the intraframe decoder and the interframe decoder comprises changing over the reproduced code signals from the interframe decoder to the intraframe decoder after said predetermined number of code signals has been reproduced and changing over the reproduced code signals from the intraframe decoder to the interframe decoder after an intraframe code signal has been reproduced.

13. The method of claim 12 wherein each turn is comprised of several data frames, with each intraframe code signal recorded in plural data frames and the predetermined number of interframe code signals recorded in next-following data frames.

14. The method of claim 13 wherein said predetermined number of interframe code signals is recorded in less than said predetermined number of data frames.

15. The method of claim 11 wherein the number of interframe code signals recorded between successive intraframe code signals varies with the radius of the turn in which said interframe code signals are recorded, and wherein the step of changing over the reproduced code signals between the intraframe decoder and the interframe decoder includes the step of controlling the change-over as a function of the radius of the turn from which the code signals are reproduced.

16. The method of claim 15 wherein the number of interframe code signals recorded between successive intraframe code signals increases as the radius of the turn in which said interframe code signals are recorded increases, and wherein the step of controlling the change-over comprises changing over the reproduced code signals from the interframe decoder to the intraframe decoder after a variable number of interframe code signals has been reproduced, said variable number being determined by the radius of the turn from which the interframe code signals are reproduced.

17. The method of claim 16 wherein only one intraframe code signal is recorded in a turn, and wherein the step of changing over the reproduced code signals between the intraframe decoder and the interframe decoder further includes changing over the reproduced code signals from the intraframe decoder to the interframe decoder after an intraframe code signal is reproduced.

18. The method of claim 11 wherein the intraframe code signal and/or the interframe code signal includes identifying data; wherein the step of sensing comprises detecting said identifying data; and wherein the step of changing over the reproduced code signals comprises coupling said reproduced code signals to said intraframe decoder or to said interframe decoder in response to the detected identifying data.

19. A method of recording image data in successive turns on a rotatable medium driven at substantially constant linear velocity, comprising: receiving successive image frames of said image data; converting a first of said image frames of image data to an intraframe code signal; converting m succeeding image frames of image data to m interframe code signals, wherein m is a variable integer depending upon the particular turn in which the intraframe and interframe code signals are recorded; and recording the intraframe code signal and m interframe code signals on said medium.

20. The method of claim 19 wherein the step of recording includes recording intraframe code signals at locations proximate each other in successive turns.

21. The method of claim 20 wherein the step of recording further includes recording only one intraframe code signal in each turn.

22. The method of claim 19 wherein the step of converting m succeeding image frames of image data to m interframe code signals includes data compressing said m image frames of image data such that each interframe code signal is of a length less than a data frame; and wherein the step of recording includes recording said m interframe code signals in less than m data frames.

23. The method of claim 22 wherein the step of recording further includes recording an intraframe code signal in plural data frames in a turn.

24. The method of claim 19 wherein said successive turns comprise successive circular tracks on said record medium.

25. The method of claim 19 wherein said successive turns comprise a spiral track on said record medium.

26. A method of reproducing image data from successive turns on a rotatable record medium driven at substantially constant linear velocity, wherein said image data has been recorded on said medium as an intraframe code signal representing an image frame followed by a m successive interframe code signals representing m successive image frames and wherein m is a variable integer depending upon the particular turn in which the intraframe and interframe code signals are recorded, said method comprising: reproducing the intraframe and interframe code signals from each turn; selectively coupling the reproduced code signals to an intraframe decoder to decode an intraframe code signal reproduced from a turn and then to an interframe decoder to decode m successive interframe code signals reproduced from said turn, thereby to recover image data from intraframe and interframe code signals reproduced from a turn; sensing when an intraframe or interframe code signal is reproduced; and controlling the selective coupling of said reproduced code signals as a function of whether intraframe or interframe code signals are sensed as being reproduced.

27. The method of claim 26 wherein the step of controlling the selective coupling comprises sensing the turn from which the intraframe and interframe code signals are reproduced, detecting when m interframe code signals have been reproduced, and coupling the reproduced code signals to said intraframe decoder after m interframe code signals have been reproduced.

28. The method of claim 27 wherein each turn is comprised of several data frames, with each intraframe code signal recorded in a predetermined number of data frames; and wherein the step of controlling the selective coupling comprises detecting when said intraframe code signal has been reproduced from said predetermined number of data frames and coupling the reproduced code signals to said interframe decoder.

29. The method of claim 28 wherein only one intraframe code signal is recorded in each turn.

30. The method of claim 26 wherein intraframe code signals are recorded at locations proximate each other in successive turns.

31. The method of claim 26 wherein the intraframe code signal and/or the interframe code signal includes identifying data; and wherein the step of controlling the selective coupling comprises detecting said identifying data in the reproduced code signals and coupling said reproduced code signals to said intraframe decoder or to said interframe decoder in response to the detected identifying data.

32. Apparatus for recording image data in successive tracks on a rotatable medium driven at substantially constant linear velocity, comprising: input means for receiving successive image frames of said image data; intraframe encoding means for converting a first image frame of image data to an intraframe code signal; interframe encoding means for converting (n−1) succeeding image frames of image data to (n−1) interframe code signals, wherein n is the maximum number of image frames recordable in an innermost track of said medium driven at substantially constant linear velocity; and recording means for recording an intraframe code signal and at least (n−1) interframe code signals in each track.

33. The apparatus of claim 32 wherein said recording means comprises means for recording (n−1) interframe code signals between successive intraframe code signals.

34. The apparatus of claim 33 wherein said recording means records the intraframe and interframe code signals in a spiral track of successive turns.

35. The apparatus of claim 32 wherein each track is comprised of a number of data frames, and said recording means comprises means for recording an intraframe code signal in plural data frames and for recording (n−1) interframe code signals in less than (n−1) data frames.

36. The apparatus of claim 32 wherein said recording means comprises means for recording intraframe code signals at locations adjacent each other in successive tracks.

37. The apparatus of claim 32 wherein said recording means comprises means for recording more than (n−1) interframe code signals between successive intraframe code signals as the radius of the track in which said interframe code signals are recorded increases.

38. The apparatus of claim 37 wherein said recording means further comprises means for recording only one intraframe code signal in a track.

39. The apparatus of claim 38 wherein said successive tracks comprise a spiral track of successive turns.

40. The apparatus of claim 39 wherein said recording means additionally comprises means for recording an integral number of image frames in an equal number of data frames by recording said intraframe code signal in plural data frames in a turn and recording interframe code signals which follow said intraframe code signal in the remaining data frames in that turn.

41. The apparatus of claim 32 wherein said interframe encoding means comprises means for comparing one frame of image data to a preceding frame of image data and means for encoding the differences therebetween such that said interframe code signal represents said differences.

42. Apparatus for reproducing image data from successive turns on a rotatable record medium driven at substantially constant linear velocity, wherein said image data has been recorded as an intraframe code signal representing an image frame followed by (n−1) successive interframe code signals representing (n−1) successive image frames, where n is at least as large as the capacity of image frame signals recordable in an innermost turn, said apparatus comprising: playback means for reproducing the intraframe and interframe code signals in each turn; intraframe decoder means for recovering image data from the reproduced code signals; interframe decoder means for recovering image data from the reproduced code signals; sensing means for sensing if an intraframe or interframe code signal is reproduced; and coupling means for coupling the reproduced code signals to the intraframe decoder means or to the interframe decoder means as a function of whether said intraframe or interframe code signals are sensed as being reproduced.

43. The apparatus of claim 42 wherein a predetermined number of interframe code signals is recorded between successive intraframe code signals, and wherein said coupling means comprises change-over means for changing over the coupling of the reproduced code signals from the interframe decoder means to the intraframe decoder means after said predetermined number of code signals has been reproduced and for changing over the coupling of the reproduced code signals from the intraframe decoder means to the interframe decoder means after an intraframe code signal has been reproduced.

44. The apparatus of claim 43 wherein each turn is comprised of several data frames, with each intraframe code signal recorded in plural data frames and the predetermined number of interframe code signals recorded in next-following data frames.

45. The apparatus of claim 44 wherein said predetermined number of interframe code signals is recorded in less than said predetermined number of data frames.

46. The apparatus of claim 42 wherein the number of interframe code signals recorded between successive intraframe code signals varies with the radius of the turn in which said interframe code signals are recorded, and wherein said coupling means includes control means for controlling said coupling means as a function of the radius of the turn from which the code signals are reproduced.

47. The apparatus of claim 46 wherein the number of interframe code signals recorded between successive intraframe code signals increases as the radius of the turn in which said interframe code signals are recorded increases, and wherein said control means includes means for changing over the coupling of the reproduced code signals from the interframe decoder means to the intraframe decoder means after a variable number of interframe code signals has been reproduced, said variable number being determined by the radius of the turn from which the interframe code signals are reproduced.

48. The apparatus of claim 47 wherein only one intraframe code signal is recorded in a turn, and wherein said control means further includes means for changing over the reproduced code signals from the intraframe decoder means to the interframe decoder means after an intraframe code signal is reproduced.

49. The apparatus of claim 42 wherein the intraframe code signal and/or the interframe code signal includes identifying data; and wherein said coupling means comprises means for detecting said identifying data, and means for supplying said reproduced code signals to said intraframe decoder means or to said interframe decoder means in response to the detected identifying data.

50. Apparatus for recording image data in successive turns on a rotatable medium driven at substantially constant linear velocity, comprising: input means for receiving successive image frames of said image data; intraframe encoding means for converting a first of said image frames of image data to an intraframe code signal; interframe encoding means for converting m succeeding image frames of image data to m interframe code signals, wherein m is a variable integer depending upon the particular turn in which the intraframe and interframe code signals are recorded; and recording means for recording the intraframe code signal and m interframe code signals on said medium.

51. The apparatus of claim 50 wherein said recording means includes means for recording intraframe code signals at locations proximate each other in successive turns.

52. The apparatus of claim 51 wherein said recording means further includes means for recording only one intraframe code signal in each turn.

53. The apparatus of claim 50 wherein said interframe encoding means includes means for data compressing said m image frames of image data such that each interframe code signal is of a length less than a data frame; and wherein said recording means includes means for recording said m interframe code signals in less than m data frames.

54. The apparatus of claim 53 wherein said recording means further includes means for recording an intraframe code signal in plural data frames in a turn.

55. The apparatus of claim 50 wherein said successive turns comprise successive annular tracks on said record medium.

56. The apparatus of claim 50 wherein said successive turns comprise a spiral track on said record medium.

57. Apparatus for reproducing image data from successive turns on a rotatable record medium driven at substantially constant linear, wherein said image data has been recorded on said medium as an intraframe code signal representing an image frame followed by m successive interframe code signals representing m successive image frames and wherein m is a variable integer depending upon the particular turn in which the intraframe and interframe code signals are recorded, said apparatus comprising: playback means for reproducing the intraframe and interframe code signals from each turn; intraframe decoder means for decoding an intraframe code signal to recover image data therefrom; interframe decoder means for decoding m successive interframe code signals to recover image data therefrom; coupling means for selectively coupling the code signals reproduced from a turn to said intraframe decoder means or to said interframe decoder means; and control means for controlling the selective coupling of said reproduced code signals as a function of whether intraframe or interframe code signals are reproduced.

58. The apparatus of claim 57 wherein said control means comprises sense means for sensing the turn from which the intraframe and interframe code signals are reproduced, detecting means for detecting when m interframe code signals have been reproduced, and means for coupling the reproduced code signals to said intraframe decoder means after m interframe code signals have been reproduced.

59. The apparatus of claim 58 wherein each turn is comprised of several data frames, with each intraframe code signal recorded in a predetermined number of data frames; and wherein said control means further comprises means for detecting when said intraframe code signal has been reproduced from said predetermined number of data frames and means for coupling the reproduced code signals to said interframe decoder means in response thereto.

60. The apparatus of claim 59 wherein only one intraframe code signal is recorded in each turn.

61. The apparatus of claim 57 wherein intraframe code signals are recorded at locations proximate each other in successive turns.

62. The apparatus of claim 57 wherein the intraframe code signal and/or the interframe code signal includes identifying data; and wherein said control means comprises means for detecting said identifying data in the reproduced code signals, and means for coupling said reproduced code signals to said intraframe decoder means or to said interframe decoder means in response to the detected identifying data.

* * * * *